United States Patent
Gafafer et al.

(10) Patent No.: US 11,112,417 B2
(45) Date of Patent: Sep. 7, 2021

(54) METHOD FOR LOADING A SPECIMEN STORAGE DEVICE FOR A PLURALITY OF SPECIMEN CARRIERS LOADED WITH SPECIMEN VESSELS, AND SPECIMEN-LOADING SYSTEM

(71) Applicant: HAMILTON STORAGE GMBH, Malans (CH)

(72) Inventors: Tobias Gafafer, Igis (CH); Marco Hosang, Bonaduz (CH); Martin Frey, Reichenburg (CH); Gian Zaugg, Chur (CH)

(73) Assignee: HAMILTON STORAGE GMBH, Domat/Ems (CH)

(*) Notice: Subject to any disclaimer, the term of this patent is extended or adjusted under 35 U.S.C. 154(b) by 192 days.

(21) Appl. No.: 16/313,631

(22) PCT Filed: Jun. 30, 2017

(86) PCT No.: PCT/EP2017/066239
§ 371 (c)(1),
(2) Date: Feb. 1, 2019

(87) PCT Pub. No.: WO2018/002287
PCT Pub. Date: Jan. 4, 2018

(65) Prior Publication Data
US 2020/0025780 A1 Jan. 23, 2020

(30) Foreign Application Priority Data
Jul. 1, 2016 (DE) ...................... 10 2016 112 114.2

(51) Int. Cl.
*G01N 35/00* (2006.01)
*B65G 1/137* (2006.01)
(Continued)

(52) U.S. Cl.
CPC ......... *G01N 35/0092* (2013.01); *B65G 1/137* (2013.01); *G01N 35/0099* (2013.01);
(Continued)

(58) Field of Classification Search
CPC ............. G01N 35/04; G01N 35/00584; G01N 35/0092; G01N 2035/0094;
(Continued)

(56) References Cited

U.S. PATENT DOCUMENTS 8,083,994 B2 12/2011 Neeper et al.
8,176,747 B2 5/2012 Howard et al.
(Continued)

FOREIGN PATENT DOCUMENTS

DE 60308591 T2 8/2007
EP 1003039 A1 5/2000

OTHER PUBLICATIONS

International Preliminary Report on Patentability and Written Opinion issued for International Application No. PCT/EP2017/066239 dated Sep. 11, 2017, 8 pages.

*Primary Examiner* — Benjamin R Schmitt
(74) *Attorney, Agent, or Firm* — Rothwell, Figg, Ernst & Manbeck, P.C.

(57) ABSTRACT

The present invention relates to a method of loading a sample storage device (10) for a plurality of sample carriers (38A-38E) equipped with sample containers (34), said method comprising: during removal of sample containers (34) from the sample storage device (10): providing at least one output sample carrier (38A) having sample containers (34) that can be taken up from the output sample carrier (38A); providing a target sample carrier (38B) in which sample containers (34) taken up from the output sample carrier (38A) can be deposited; providing a refilling sample carrier (38C) which is at least partially filled with sample (Continued)

containers (34); removing at least one sample container (34) from the output sample carrier (38A) and depositing the at least one sample container (34) in the target sample carrier (38B), and for each sample container (34) removed from the output sample carrier (38A) and deposited in the target sample carrier (38B), removing another sample container (34) from the refilling sample carrier (38C) and refilling the space of the removed sample container (34) in the output sample carrier (38A) with the other sample container (34) from the refilling sample carrier (38C). Moreover, the invention relates to a loading system (12) designed for performing the method.

25 Claims, 3 Drawing Sheets

(51) Int. Cl.
*G01N 35/04* (2006.01)
*B01L 9/06* (2006.01)

(52) U.S. Cl.
CPC ........ *B01L 9/06* (2013.01); *G01N 2035/0094* (2013.01); *G01N 2035/0425* (2013.01)

(58) Field of Classification Search
CPC ....... G01N 35/0099; G01N 2035/0425; B65G 1/04; B65G 1/137; B01L 9/06; B04B 2011/046
USPC .............................................. 73/863, 863.01
See application file for complete search history.

(56) References Cited

U.S. PATENT DOCUMENTS

| | | |
|---|---|---|
| 2003/0223916 A1* | 12/2003 | Testrut ...................... B01L 9/06 422/400 |
| 2009/0003981 A1 | 1/2009 | Miller |
| 2009/0142844 A1 | 6/2009 | Le Comte |
| 2013/0061693 A1 | 3/2013 | Sasaki et al. |
| 2015/0075298 A1 | 3/2015 | Hecht |
| 2016/0016183 A1* | 1/2016 | Miller .................. B04B 5/0414 494/1 |

* cited by examiner

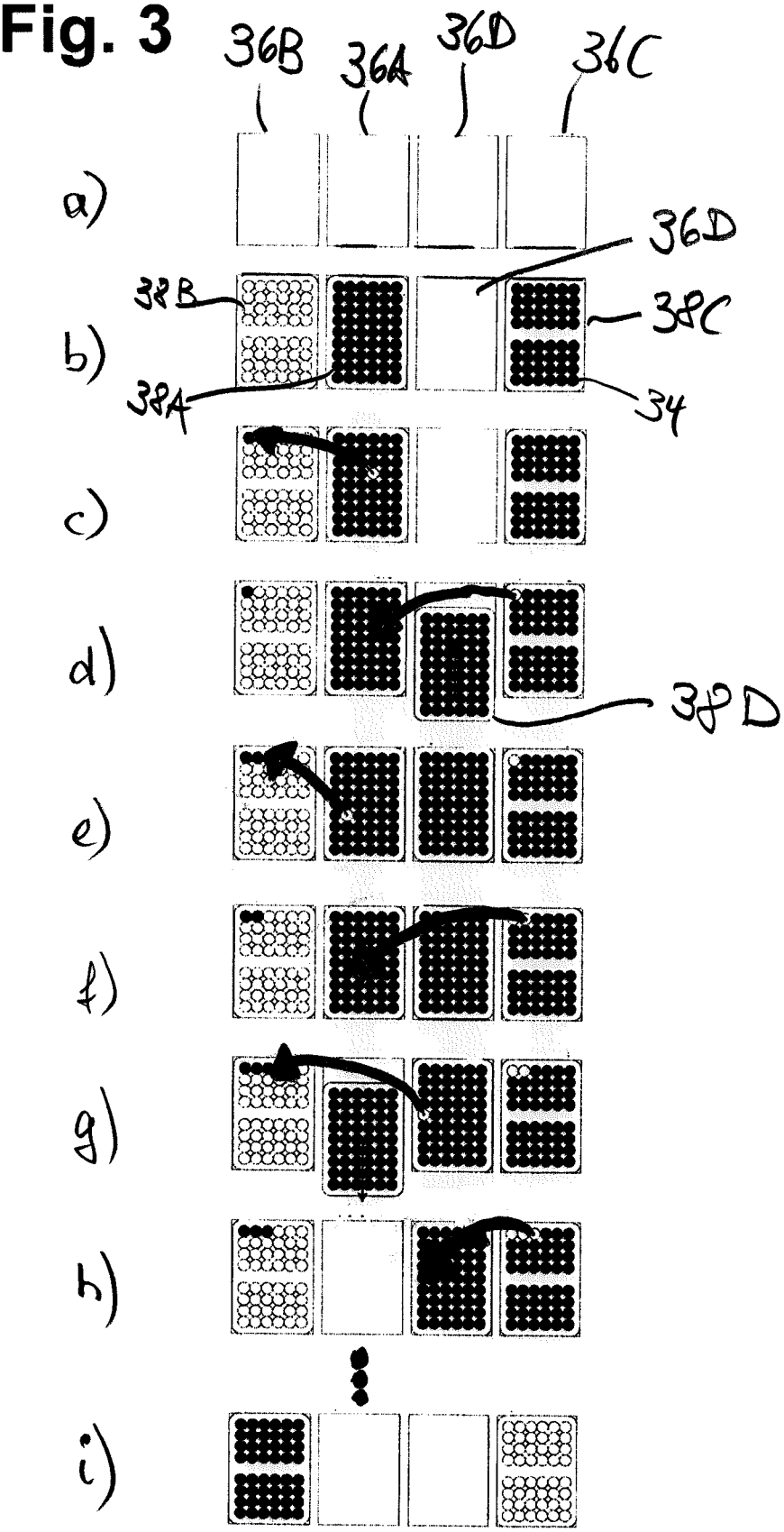

METHOD FOR LOADING A SPECIMEN STORAGE DEVICE FOR A PLURALITY OF SPECIMEN CARRIERS LOADED WITH SPECIMEN VESSELS, AND SPECIMEN-LOADING SYSTEM

CROSS REFERENCE TO RELATED APPLICATION

This application is a 35 U.S.C. § 371 National Phase Entry Application from PCT/EP2017/066239, filed on Jun. 30, 2017, and designating the United States, which claims the benefit of priority from German Patent Application No. DE 10 2016 112 114.2 filed on Jul. 1, 2016, the full disclosure of which are incorporated herein in their entirety by reference.

The present invention relates to a method of loading a sample storage device for a plurality of sample carriers carrying sample containers, and to a sample loading system for storing and/or removing sample containers from such a sample storage device.

Sample loading systems of this type are used as a rule for automated depositing and removal or retrieval, respectively, of samples containing biological, microbiological and/or chemical material from sample storage devices in the chemical, biochemical, pharmaceutical or biological industries and research. The sample storage devices work largely or even completely in automated manner. The samples are stored in sample containers and contain certain reagents, which may be of a chemical, biochemical or biological nature, and are stored under given ambient conditions, often at freezing temperatures down to −20° C., sometimes even between −50° C. and −90° C., and sometimes even below. In the facilities of this type, it is desired to obtain a large throughput, i.e. it should be possible to continuously remove an as large as possible number of sample containers per unit of time from the storage of such a sample storage device and, respectively, to deposit or store the same in the storage. To this end, there is used a sample loading system having a transport unit for transporting sample carriers between the storage for sample carriers, a sample receiving and/or dispensing module and an input/output interface. The sample receiving and/or dispensing module comprises, in particular, a gripping device by means of which individual sample containers can be removed from an output sample carrier in a sample removal process and can be deposited again in a target sample carrier. The sample loading system also serves conversely for storing sample containers in the sample storage device. The storing process can take place in such a way that corresponding sample carriers with sample containers to be stored are provided in the input/output interface and are then brought either directly into the storage by means of the transport unit or are first brought to the sample receiving and/or dispensing module, where the individual sample containers are then deposited by means of the gripping device in a target sample carrier which thereafter is brought into the storage by means of the transport unit.

U.S. Pat. No. 8,176,747 B2 discloses such a sample loading system for an automated storage device for sample containers. The sample loading system comprises a buffer storage or cache with a plurality of sample container receptacles, in which sample containers to be retrieved from a sample storage are buffered before being deposited in a sample carrier to be output. The buffer storage is loaded by a sample carrier transport unit, which transports sample carriers stored in the sample storage from the sample storage to the buffer storage and, after removal of the required sample containers, transports them back from the buffer storage to the sample storage. U.S. Pat. No. 8,083,994 B2 also discloses such an automated storage system for sample containers accommodated in sample carriers. The storage system comprises a sample storage as well as a sample carrier transport unit. The sample carrier transport unit delivers sample carriers from the sample storage to a sample receiving/dispensing module, in which individual sample containers can be removed from the sample carriers and deposited in destination sample carriers, and, vice versa, sample containers from input sample carriers can be deposited in desired sample carriers from the storage system. The sample carrier transport unit operates independently of the sample receiving/dispensing modules.

In the case of the aforementioned sample storage devices, a progressing, incomplete filling of the sample carriers stored in the sample storage with sample containers inevitably occurs during operation as the operating time increases. The reason for this is that, during each removal process, sample containers are removed from sample carriers in the sample storage and are deposited in target sample carriers. The sample carriers transported back to the sample storage after the removal process therefore have gaps at the locations of the removed sample carriers. These gaps cannot be readily filled. In particular, it is difficult, if not almost impossible, to store sample containers once removed from the sample storage, after effected return of the same, again at the same location in the sample storage from which they were removed. Also during sample storage processes, sample carriers incompletely filled with sample containers are as a rule provided in the input/output interface, which are then returned to the sample storage. In accordance with the steadily decreasing filling degree of the sample carriers stored in the sample storage, the efficiency of the sample storage device continues to drop, on the one hand, because more and more storage space is required to store the same number of sample containers because of the ever lower storage space utilization, but on the other hand also because more and more transport operations are necessary and increasingly longer transport routes must be covered for sample storage and retrieval, respectively. Therefore, in all sample storage devices of the type described herein, a rearrangement of the sample containers stored in the sample storage has to be carried out from time to time. In this process, sample carriers are purposefully fetched from the sample storage and the sample containers accommodated therein are distributed to other sample carriers until all sample carriers in the storage are filled again as completely as possible. Such rearrangement procedures are by nature time consuming and reduce the sample throughput, because the sample storage device is not available, or in any case is available in very limited manner only, for dispensing sample containers and/or for storing sample containers for the duration of the rearrangement procedure.

The present invention meets the object of improving the throughput in terms of sample container removal and/or sample container storage in a sample storage device of the type described above. In particular, the present invention provides a suggestion how a progressing deterioration of the utilization of the sample storage during operation can be suppressed as far as possible, in such a manner that as little system resources as possible are required for sample container rearrangement procedures.

For achieving the above-indicated object, there is suggested a method for loading a sample storage device for a plurality of sample carriers carrying sample containers, which comprises the following steps during removal of sample containers from the sample storage device:

provalidating at least one output sample carrier having sample containers that can be taken up from the output sample carrier;

providing a target sample carrier in which sample containers taken up from the output sample carrier can be deposited;

providing a refilling sample carrier which is at least partially filled with sample containers;

removing at least one sample container from the output sample carrier and depositing the at least one sample container in the target sample carrier, and for each sample container removed from the output sample carrier and deposited in the target sample carrier, removing another sample container from the refilling sample carrier and refilling the space of the removed sample container in the output sample carrier with said other sample container from the refilling sample carrier.

When the term "sample carrier" is used in connection with the present invention, this term is intended to cover a unit of any type in which a plurality of sample containers can be received directly or indirectly. In particular, a sample carrier may have a plurality of receptacles for directly receiving individual sample containers. However, a sample carrier can also be designed such that it can accommodate a further sample carrier which in turn has receptacles in which individual sample containers may be directly received. For example, it is customary to use larger sample carriers for storing sample containers in a sample storage of the sample storage device, in which a plurality of sample containers are directly received (such sample carriers will also be referred to as "storage sample carriers" in the following), whereas other sample carriers are used for outputting sample containers to be dispensed or for entering or inputting sample containers to be stored, in particular sample carriers of smaller format. Therefore, for transport of such other sample carriers or individual sample containers between an input/output interface and a sample receiving/dispensing module, there will often be used specifically designed sample carriers in which either individual sample containers or one or more of the other sample carriers can be accommodated, which serve for input/output of sample containers (in the following, such specifically designed sample carriers for transport between an input/output interface and a sample receiving/dispensing module will also be referred to as "transfer sample carriers").

The basic idea of the present invention consists in combining a sample removal process as a matter of principle with a sample storing process taking place simultaneously—or at least overlapping in time or immediately following the same. Therefore, a complete loading process should always take place, which comprises both the removal of a sample container from an output sample carrier and the taking up of a sample container in the output sample carrier. To this end, a further refilling sample carrier is to be provided in addition in a loading process, which in principle is to take place for removing a sample container from an output sample carrier and for receiving the same in a target sample carrier. A further sample container may then be removed from the refilling sample carrier and may be received again in the output sample carrier at the location of the sample container just removed from the output sample carrier. In this way, gaps arising in the output sample carrier during sample removal can be closed so to speak in real time so that the output sample carrier after the sample removal again has the same degree of filling as before the beginning of the sample removal. As a rule, the output sample carrier will be provided from a storage area of the sample storage device during a sample removal process. After sample removal has taken place, a sample carrier can thus be transported back to the storage area, the filling degree of which is still the same as before the beginning of the sample removal. Ideally, the filling degree of the sample carrier before and after sample removal is 100%. In other words, the present invention provides for a defragmentation of the sample carriers in real time, or an "on-line defragmentation" of the sample carriers.

The method steps mentioned as a matter of principle can be carried out without movement of the participating sample carriers. For this purpose, the sample carriers, in particular the output sample carrier, the target sample carrier and the refilling sample carrier, can be provided in a sample receiving/dispensing module. The sample carriers as a rule do not need to be moved, in particular not between said method step (i) removing at least one sample container from the output sample carrier and depositing the at least one sample container in the target sample carrier, and the other method step (ii) removing another sample container from the refilling sample carrier and refilling the space of the removed sample container in the output sample carrier with the other sample container from the refilling sample carrier. As a result, the method can be carried out very quickly and in particular does not take much more time than a method in which only the step of removing at least one sample container from the output sample carrier and depositing the at least one sample container in the target sample carrier is carried out.

The filling of the location of the removed sample container in the output sample carrier with the other sample container from the refilling sample carrier can take place immediately after removal of the sample container from the output sample carrier. This can be done quickly in particular when all sample carriers, in particular the output sample carrier and refilling sample carrier, are already provided at the beginning of the removal process. Then, only a gripping device needs to be present, which is designed such that it can perform the refilling process immediately after the removal. When a corresponding number of gripping tools is present, it is very well possible for a plurality of sample containers to be simultaneously removed from the output sample carrier and deposited in the target sample carrier. In this case, it will be expediently provided that a corresponding refilling process is carried out for each removal process as well.

With a corresponding design of the gripping device, refilling of the space of the removed sample container in the output sample carrier with the other sample container from the refilling sample carrier may overlap in time with the removal of the sample container from the output sample carrier and/or the deposition of the sample container in the target sample carrier. Of course, such an approach saves even more time. However, correspondingly more elaborate gripping tools are required, for example, turret-like gripping tools.

In the method suggested here, the refilling sample carrier in the simplest case is not replaced, but is used for refilling gaps arising in the output sample carrier until there are no further sample containers present in the refilling sample carrier. For example, the refilling sample carrier basically can remain in a receiving/dispensing module, also in case the output sample carrier and/or the target sample carrier are replaced. As soon as the refilling sample carrier does no longer contain additional sample containers, it may be provided to replace the refilling sample carrier by another refilling sample carrier.

Basically, it is possible to use as refilling sample carriers all sample carriers stored in a sample storage of the sample storage device. The refilling sample carrier then can be selected from the sample carriers stored in the sample storage of the sample storage device. In this regard, it may be advantageous to select as filling sample carrier, from the sample carriers stored in the sample storage, at least one sample carrier having an as low as possible number of sample containers deposited therein. It is thus avoided that completely filled sample carriers in the sample storage, or sample carriers that are almost completely filled, are utilized for rearranging sample containers.

It may be expedient to provide a buffer storage for the refilling sample carrier. Such a buffer storage may have certain sample carriers temporarily stored therein, which may be considered for potential use as refilling sample carriers. If the refilling sample carrier has to be replaced, the new refilling sample carrier then can be taken from the buffer storage of the sample storage device so that, for replacing a refilling sample carrier, it is not necessary to take recourse to a sample carrier from the storage of the sample storage device. This approach is expedient, for example, when the storage is used for storing sample carriers at low temperatures, as the number of accesses to the storage can thus be kept low. For example, it may be provided to have a certain minimum number of sample carriers kept ready in the buffer storage at all times and, whenever the number of sample carriers in the buffer storage falls below the minimum number, to shift a certain number of sample carriers from the storage area into the buffer storage.

The method suggested here also offers advantages in the course of a storage process for storing sample containers in a sample storage of the sample storage device. The following steps may be provided then: (i) providing at least one sample container to be stored in an input sample carrier; and (ii) before depositing or storing the input sample carrier in the sample storage, checking whether the input sample carrier can be utilized as refilling sample carrier. As already mentioned above, the input sample carrier basically is a sample carrier which accommodates one or more smaller sample carriers with sample containers. In this sense, the input sample carrier in a storing process has the same configuration as the target sample carrier in a removal or retrieval process. Like the target sample carrier, the input sample carrier is also used for transport between the input/output interface, on the one hand, and the sample receiving/dispensing module or the buffer storage, on the other hand. In this way, two birds can be killed with one stone: Normally, each removal process of sample containers from the storage device as well as each storage process of sample containers in the storage device leads to an increasing fragmentation of the sample containers stored in the storage unit of the storage device. The procedure described here has the effect that the removal processes are coupled with the storage processes in such a way that the input sample carriers provided in the course of storage processes can simultaneously serve as refilling sample carriers for the output sample carriers required in the course of removal processes. This avoids, on the one hand, that incompletely filled input sample carriers get into the storage and, on the other hand, it is ensured that gaps arising in the output sample carriers are filled again immediately. This greatly increases the efficiency of sample loading and the overall operation of the storage device.

For example, the input sample carriers provided in the course of storage processes may be stored temporarily in the buffer storage, so that they are available as potential refilling sample carriers. The buffer storage can then be equipped, for example, primarily with input sample carriers which are provided anyway from storage processes. Should it happen that there are too few input sample carriers available, it may be provided that the buffer storage is refilled with refilling sample carriers from the sample storage, for example, when the number of refilling sample carriers in the buffer storage falls below a predetermined number. Should the buffer storage already be filled completely, it is of course possible as well that input sample carriers are exceptionally stored directly in a storage unit of the storage device.

Especially the above-described combination of removal processes and storage processes allows the removal of sample containers from the sample storage and the storage of sample containers in the sample storage to take place at the same time—or at least overlapping in time. Such an approach is even particularly favorable because it allows defragmentation of the sample carriers to be carried out in real time essentially without recourse to sample carriers stored in the storage unit. Also, the removal of refilling sample carriers from the buffer storage and/or the inclusion of refilling sample carriers in the buffer storage can take place concomitantly—or at least overlapping in time—with the inclusion of sample containers from the output sample carrier and/or the deposition of sample containers in the target sample carrier. This applies in particular when a transport unit is provided which can handle the transport of sample carriers between an input/output interface and the buffer storage or between the buffer storage and a sample receiving/dispensing module independently of the work of the sample receiving/dispensing module.

Even more time can be saved when concomitantly—or at least overlapping in time—with the filling of a target sample carrier with sample containers from a first output sample carrier, a further output sample carrier is provided from which sample containers can be taken and deposited in the target sample carrier in a subsequent step. In this case, it is possible in the course of a removal process to change from the first output sample carrier to the further output sample carrier without loss of time. Such a procedure can also be implemented well when a transport unit operating independently of the sample receiving/dispensing module is provided. In addition, concomitantly—or at least overlapping in time—with the filling of an output sample carrier with sample containers from a first refilling sample carrier, a further refilling sample carrier can be provided from which sample containers can be removed and deposited in the output sample carrier in a subsequent step. This can be useful, for example, when it becomes apparent that the first refilling sample carrier is gradually emptying. For implementing the procedures described here, the sample receiving/dispensing module may have corresponding additional receptacles for the further output sample carrier and/or for the further refilling sample carrier.

For implementing the method described hereinbefore, there may be provided a loading system cooperating with a sample storage of the sample storage device. The loading system may be part of the sample storage device. The loading system, for example, may comprise a sample receiving/dispensing module for taking up sample containers from sample carriers and/or for depositing sample containers in sample carriers. In this context, the sample receiving/dispensing module has at least three receptacles provided therein for the output sample carrier, the target sample carrier and the refilling sample carrier. In addition, a fourth receptacle for a further output sample carrier with sample containers to be taken up from the output sample carrier can be provided in the sample receiving/dispensing module. The loading system then will be configured such that, concomitantly—or at least overlapping in time—with the filling of the target sample carrier with sample containers from the first output sample carrier received in the first receptacle, a further output sample carrier is provided in the fourth receptacle, from which sample containers can be removed and deposited in the target sample carrier in a subsequent step. Moreover, a fifth receptacle for a further refilling sample carrier may be provided in the sample receiving/dispensing module. The loading system then will be configured such that concomitantly—or at least overlapping in time—with the filling of the output sample carrier with sample containers from the first refilling sample carrier received in the third receptacle, a further refilling sample carrier is provided in the fifth receptacle, from which sample containers can be removed and deposited in the output sample carrier in a subsequent step. The position of the first, second, third, optionally fourth and optionally fifth receptacle can be fixed in the sample receiving/dispensing module.

In addition, the loading system may have at least one input/output interface for inputting or entering sample containers to be stored and/or for outputting sample containers to be dispensed. The input/output interface serves in particular for communication between the sample storage device and its surroundings, in particular for transferring sample containers between the sample storage device and the surroundings. For this purpose, the input/output interface may have suitable lock devices, in particular for the case that sample containers are stored under special ambient conditions (e.g. at low temperatures).

Moreover, the loading system may comprise at least one sample carrier transport unit for transporting sample carriers between the sample storage, the sample receiving/dispensing module and optionally the input/output interface. It is particularly favorable when the transport unit is designed such that it can work independently of the operation of other components, in particular independently of the sample receiving/dispensing module. It is particularly advantageous when the transport unit is designed such that, after loading of the sample receiving/dispensing module with output sample carrier, target sample carrier, refilling sample carrier or similar sample carriers, it can perform other transport operations without affecting the treatment of the sample carriers located in the sample receiving/dispensing module.

As already mentioned, sample carriers of different types can be used in the sample storage device. In particular, the output sample carrier may be a storage sample carrier intended for storage in the sample storage unit. In particular, the target sample carrier and/or the input sample carrier may be a transfer sample carrier intended for transporting sample containers between the sample storage or the sample receiving/dispensing module and an input/output interface. In particular, the refilling sample carrier may be a transfer sample carrier intended for transporting sample containers between the sample storage or the sample receiving/dispensing module and an input/output interface, or a storage sample carrier intended for storage in the sample storage.

The method described hereinbefore can be carried out by an electronic control unit. With appropriate programming, such an electronic control unit allows a largely—or even completely—automated implementation of the method. Such an electronic control unit may be part of a control of the sample storage device, it may be associated with the loading system.

According to a further aspect, the present invention also relates to a sample loading system for storing and/or removing sample containers from a sample storage device for a plurality of sample carriers equipped with sample containers.

Such a sample loading system comprises:
- a first receptacle for an output sample carrier having sample containers that can be taken up from the output sample carrier;
- a second receptacle for a target sample carrier in which sample containers taken up from the output sample carrier can be deposited; and
- a third receptacle for a refilling sample carrier which is at least partially filled with sample containers, wherein the sample loading system is designed such that, for each sample container removed from the output sample carrier and deposited in the target sample carrier, there is removed another sample container from the refilling sample carrier and the space of the removed sample container in the output sample carrier is refilled with the other sample container from the refilling sample carrier.

Such a sample loading system is particularly adapted for carrying out the method described herein. To this end, the sample loading system comprises in particular an electronic control unit which is configured to carry out the method described. Moreover, the sample loading system may comprise additional components, as described in detail hereinbefore in connection with the explanation of the suggestion according to the invention. The sample loading system may be part of a sample storage device of the type described herein.

The invention will be explained in more detail in the following by way of an embodiment with reference to the drawings, wherein:

FIG. 3 shows a schematic representation of the course of a sample removal process according to an embodiment.

Figure 1:
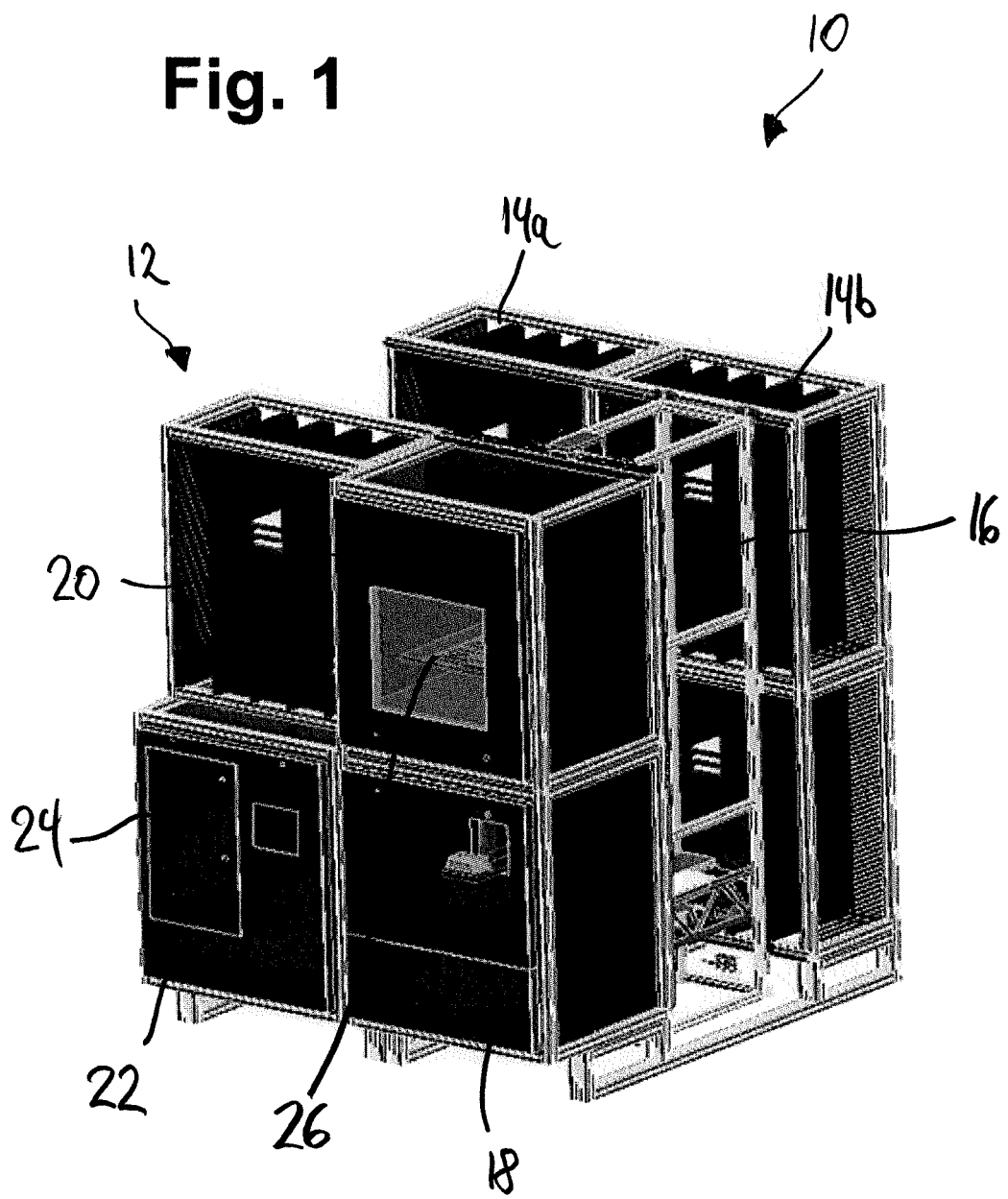
FIG. 1 shows a perspective view of a schematic representation of a sample storage device.

In all figures, like reference numerals designate like or similar components. For a more detailed description, reference is made to the respective first figure that illustrates a respective component. Unless explicitly stated otherwise, the same description applies to all other figures as well. These are usually described only insofar as changes or additions to the previous figures need to be explained. It is understood that supplements also refer to the other figures.

FIG. 1 shows a perspective view of a schematic representation of a sample storage device 10. The sample storage device 10 is configured to perform a loading method according to an embodiment of the present invention and for this purpose includes a correspondingly designed sample loading system, generally designated 12. The sample storage device 10 comprises a plurality of sample storages, two of which are exemplified by reference numerals 14a and 14b. In the sample storages 14a, 14b, there are stored sample containers which are received in storage sample carriers each (not shown in FIG. 1). The sample containers contain samples, usually in liquid form, which are to be stored in the sample storages 14a, 14b under predetermined ambient conditions. The samples may include, for example, biological, microbiological and/or chemical material as used in the chemical, biochemical, pharmaceutical or biological industries and research fields. The samples contain certain reagents which may be of a chemical, biochemical or biological nature, and are stored under predetermined ambient conditions in the sample storages 14a, 14b. Depending on the particular configuration, the sample storages 14a, 14b may be designed to store the samples at freezing temperatures of down to −20° C., if necessary even between −50° C. and −90° C., and sometimes even below. The sample storage device 10 operates in largely or even fully automated manner, i.e. sample containers can be automatically stored in one of the sample storages 14a, 14a and/or automatically removed from the corresponding sample storage 14a, 14b without human intervention with the aid of the sample loading system 12.

With systems of this kind, it is desired to have a large throughput, i.e. it is desired that an as large as possible number of sample containers per unit of time can be removed from the sample storages 14a, 14b or can be deposited in a desired one of the sample storages 14a, 14b in continuous manner. The sample loading system 12 serves this purpose. The sample loading system 12 comprises a main transport unit 16, an additional transport unit 18, a sample receiving/dispensing module 20, and an input/output interface 22. The main transport unit 16 is designed to transport sample carriers, which generally have the configuration of storage sample carriers in the sense described hereinbefore, between the sample storages 14a, 14b and the sample receiving/dispensing module 20. The auxiliary transport unit 18 is designed for transporting sample carriers, which generally have the configuration of transfer sample carriers in the sense described hereinbefore, between the sample receiving/dispensing module 20 and the input/output interface 22. The input/output interface 20 serves for interaction with a user or other systems that should have access to sample containers stored in the sample storage device 10. In particular, removal processes of sample containers from the sample storage device 10 and/or storage processes of sample containers in the sample storage device 10, are carried out via the input/output interface 22. For this purpose, the input/output interface 22 has a removal/storage opening 24. In the course of a removal process, the additional transport unit 18 provides sample carriers, each containing a number of desired retrieved sample containers, in a space behind the removal/storage opening 24, so that these sample carriers can be removed by opening the removal/storage opening 24. In the course of a storage process sample carriers, each containing a number of desired sample containers to be stored, are provided in the space behind the removal/storage opening 24 so that these sample carriers can be transported by the additional transport unit 18 to the sample receiving/dispensing module 20 and from there onwards through the main transport unit 16 to the respective sample storage 14a, 14b.

The sample receiving/dispensing module 20 serves for transferring sample containers from storage sample carriers, which are supplied by the main transport unit 16 from the respective sample storage 14a, 14b in the course of removal processes, into transfer sample carriers which are then supplied to the input/output interface 22. The sample receiving/dispensing module 20 comprises in particular a sample carrier receptacle 26 in which a plurality of sample carriers can be received, as well as a gripping device not designated in detail in FIG. 1 (cf. reference numeral 32 in FIG. 2), by means of which individual sample containers can be removed in a sample removal process from an output sample carrier located in the sample carrier receptacle 26 (in the course of a removal process: the corresponding storage sample carrier retrieved from the sample storage) and can be deposited again in a target sample carrier likewise located in the sample carrier receptacle (in the course of a removal process: the corresponding transfer sample carrier). The sample loading system 12 conversely also serves for storing sample containers in the sample storage device 10. The storing process can take place in such a manner that corresponding sample carriers along with sample containers to be stored are provided in the input/output interface 22 and, by means of the additional transport unit 18 and the main transport unit 16, are then brought either directly into the respectively provided sample storage 14a, 14b or, by means of the additional transport unit 16, are initially brought to the sample receiving/dispensing module 20, where the individual sample containers are then deposited by means of the gripping device in a target sample carrier located in the sample carrier receptacle 26 (in the course of a storage process: the respective storage sample carrier), which is then brought to the designated sample storage 14a, 14b by means of the main transport unit 16. In addition to the sample carrier receptacle 26 and the gripping device, the sample receiving/dispensing module 20 also comprises a buffer storage, also not designated in more detail in the figures, for sample carriers. Sample carriers transported by the additional transport unit 18 from the input/output module 22 to the sample receiving/dispensing module 20 and/or sample carriers transported by the main transport unit 16 to the sample receiving/dispensing module 20 may be temporarily stored in the buffer storage.

Figure 2:
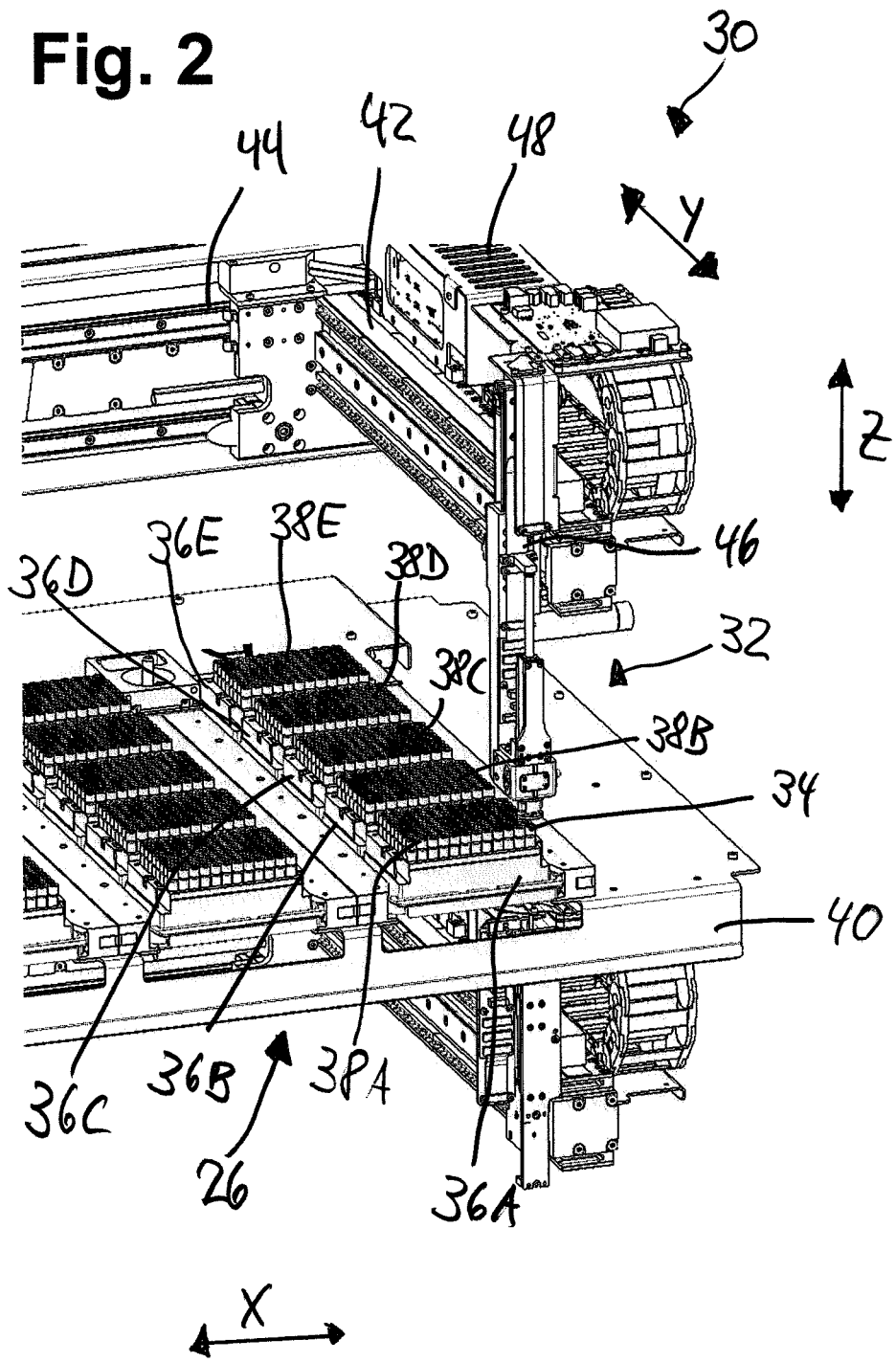
FIG. 2 shows a perspective view of a section of the sample receiving/dispensing module.

FIG. 2 shows a perspective view of a section of the sample receiving/dispensing module 20, in particular a sample manipulation device 30 with sample carrier receptacle 26 and gripping device 32. In the situation illustrated in FIG. 2, the gripping device 32 is in a configuration prior to the beginning of a lifting operation of a sample container 34 from an output sample carrier 38A in the course of a take-up manipulation.

The sample manipulation device 30 comprises a sample stage 40 extending in the XY direction and having sample carrier receptacles 36A, 36B, 36C, 36D, 36E, in each of which sample carriers 38A, 38B, 38C, 38D, 38E are accommodated. The sample carrier receptacles 36A-36E and sample carriers 38A-38E are each arranged in groups of five associated sample carrier receptacles/sample carriers. The sample carrier receptacles/sample carriers within a group are arranged linearly one after the other in the Y direction. The individual groups are arranged side by side in the X direction. For the sake of simplicity, only the sample carrier receptacles 36A-36E, having the sample carriers 38A-38E accommodated therein, of one group of sample carrier receptacles/sample carriers are provided with reference numerals in FIG. 2. It is pointed out that corresponding statements are applicable with respect to the additional groups. The sample manipulation device 30 comprises at least one of these groups. The arrangement of the group or of all groups forms the sample carrier receptacle 26 schematically illustrated in FIG. 1.

Each sample carrier 38A-38E comprises a plurality of sample container receptacles in which individual sample containers 34 (only one of which is referenced 34 in FIG. 2 in exemplary manner) can be stored. In the configuration illustrated in FIG. 2, all sample carriers 38A-38E are completely loaded with sample containers 34, and the gripper device 12 is used to perform a take-up manipulation in which one of the sample containers 34 is taken up from the sample carrier 38A.

The sample container receptacles are arranged in a respective sample carrier 38A-38E in the form of a rectangular matrix, which in the embodiment illustrated comprises 8×12=96 sample containers 34 per sample carrier 38A-38E. It is to be understood that instead of the configuration of the sample carriers according to FIG. 2, any other configuration can be selected. For example, in medical and biochemical research, sample carriers with 12, 24, 48, 96, or 384 sample receptacles are used in standard manner. The sample container receptacles can be arranged in the form of a rectangular matrix with lines and columns as in FIG. 2 or in any other configuration, for example with an offset of two adjacent lines or columns from one another. The sample containers 34 may have any configuration that is compatible with the particular sample carrier used. Conventional sample containers 34 have a substantially cylindrical body region with a diameter matched to the sample carriers 16 used, which as a rule is slightly smaller than the diameter of the respective sample carrier receptacles used.

The sample carriers 38A-38E can be transported, by means of the sample carrier transport system with main transport unit 16 and additional transport unit 18, as shown in FIG. 1 (such sample carrier transport systems are often referred to as "tray shuttle"), between the sample storage 14a, 14b and the sample receiving/dispensing module 20 and/or between the input/output interface 22 and the sample receiving/dispensing module 20. The gripping device 32 is designed such that it can remove, from sample carriers 38A-38E, sample containers 34 individually from the respectively associated sample carrier 38A-38E, or can deposit sample containers 34 individually in a sample container receptacle of a sample carrier 36A-36E. For this purpose, the sample manipulation device 30 has a first manipulator arm 42, which is linearly movable in a first direction (X direction) along a first linear guide mechanism 44 by means of a drive not shown in detail. The first manipulator arm 42 extends substantially along a second direction (Y direction) orthogonal to the first direction. The first and second directions span a plane referred to as XY plane. In the embodiment shown, the XY plane is substantially horizontal. On the first manipulator arm 42, a second manipulator arm 46 is mounted so as to be linearly movable along the first manipulator arm 42. The second manipulator arm 46 extends substantially orthogonal to the XY plane and is linearly displaceable along the first manipulator arm 42 (i.e. in the Y direction). For this purpose, a drive generally designated 48 is used. The first manipulator arm 42 has a guide mechanism, not designated in more detail, for the linear movement of the second manipulator arm 46 in the Y direction. By moving the first manipulator arm 42 along the guide mechanism 44 and the second manipulator arm 46 along the first manipulator cam 42, the second manipulator arm 46 can thus reach any position in the XY plane above (i.e. in vertically upward projection) the sample carrier receptacles on the sample stage 40.

The gripping device 32 is arranged on the second manipulator arm 46. The gripping device 32 is mounted on the second manipulator arm 46 so as to be displaceable in a direction orthogonal to the XY plane.

The sample receiving/dispensing module 20 with its sample manipulation device 30 according to FIG. 2 is designed to carry out the method proposed here. For this purpose, the sample manipulation device 30 requires at least one group of sample carrier receptacles 36A-36E and associated sample carriers 38A-38E. This group of sample carrier receptacles 36A-36E and associated sample carriers 38A-38E has to comprise at least three different sample carrier receptacles/sample carriers, namely a first receptacle 36A for an output sample carrier, a second receptacle 36B for a target sample carrier 38B, and a third receptacle 36C for a refilling sample carrier 38C. In the embodiment illustrated in FIG. 2, the group of sample carrier receptacles comprises two further sample carrier receptacles 36D, 36E and associated sample carriers 38D, 38E. This is useful, but not cogently necessary. The sample carrier receptacle 36D receives an additional output sample carrier 38D. The further sample carrier receptacle 36E receives an additional refilling sample carrier 38E.

The method proposed here will be explained in the following in more detail by way of FIG. 3. FIG. 3 illustrates, in a schematic plan view, the sample carriers 36A, 36B, 36C, 36D or the associated sample carriers 38A, 38B, 38C and 38D of a group of sample carriers according to FIG. 2, each having receptacles for sample containers 34 arranged therein. In contrast to FIG. 2, however, only four sample carrier receptacles/sample carriers are considered in FIG. 3, which are associated with a first output sample carrier 38A, a target sample carrier 38B, a refilling sample carrier 38C and a second output sample carrier 38D each. In each column of FIG. 3, there is always shown the same sample carrier or the same associated sample carrier receptacle. Each line shows the sample carrier or the sample carrier receptacle at a different stage during the removal process. If there is no sample carrier in the respective sample carrier receptacle, the receptacle is shown as an empty rectangle (cf. e.g. line a)). When a sample container 34 is located in a respective sample container receptacle of a sample carrier, the sample container receptacle is shown as a black solid dot (cf. e.g. the second column in line b), which shows an output sample carrier 38A completely filled with sample containers). When there is no sample container 34 in a respective sample container receptacle, the sample container receptacle is shown as a white circle (cf. e.g. the left-hand column in line b), which shows an empty target sample carrier 36B). In FIG. 3, only one of the sample containers is designated 34 by way of example.

In the individual lines of FIG. 3, respective states of the individual sample carrier receptacles/sample carriers 36A/38A, 36B/38B, 36C/38C and 36D/38D are illustrated progressively from line a) to line i) in the course of a removal process of sample containers 34 from the one first output sample carrier 38A into a target sample carrier 38B, and subsequently from a second output sample carrier 38D into the target sample carrier 38B, with sample containers 34 removed from the first output sample carrier 38A or from the second output sample carrier 38D being replaced immediately by sample containers from the refilling sample carrier 38C.

In the stage shown in line a), all the sample carrier receptacles 36A-36D are empty. In the stage shown in line b), the main transport unit 16 has transported an output sample carrier 38A from one of the sample storages 14a, 14b into the corresponding sample carrier receptacle 36A of the sample receiving/dispensing module 20. The output sample carrier 38A is completely filled with sample containers 34. Moreover, the additional transport unit 18 has transported a target sample carrier 38B which is still empty at this stage into the corresponding sample carrier receptacle 36B of the sample receiving/dispensing module 20 and has transported a refilling sample carrier 38C into the corresponding sample carrier receptacle 36C of the sample receiving/dispensing module 20. The refilling sample carrier 38C is completely filled with sample containers 34, but it could also be only partially filled with sample containers 34. The refilling sample carrier 38C comes from a buffer storage of the sample receiving/dispensing module 20, in which sample carriers entered via the input/output interface 22 have been deposited in the course of a storage process which has taken place beforehand.

FIG. 3 also indicates that the output sample carrier 38A is a storage sample carrier in which 9×6=54 sample containers are directly accommodated in a matrix-like arrangement. Instead of the number of sample containers shown, it is of course possible as well to make use of sample carriers in which any other number of sample containers can be accommodated. In addition, of course, other arrangements of the sample container receptacles are conceivable as well. Both the target sample carrier 38B and the refilling sample carrier 38C have the configuration of a transfer sample carrier in which sample containers 34 are not directly accommodated in sample container receptacles, but rather in which two smaller sample carriers are accommodated which, in turn, have sample container receptacles of their own in which the individual sample containers are received.

In line c) it is shown that the first sample container 34 has been removed from the output sample carrier 38A by means of the gripping device 32 and is deposited in the target sample carrier 38B. The output sample carrier 38A now contains an empty sample container receptacle at the location of the removed sample container 34.

It is shown in line d) that a further sample container 34 has been removed from the refilling sample carrier 38C by means of the gripping device 32 and is deposited in the output sample carrier 38A at the location of the sample container removed from the output sample carrier 38A. Thus, the output sample carrier 38A is again completely filled with sample containers, whereas the refilling sample carrier 38C has an empty sample container receptacle at the location of the removed sample container 34. During the refilling process, the main transport unit 16 transports a second output sample carrier 38D into the corresponding sample carrier receptacle 36D of the sample receiving/dispensing module 20. Like the first output sample carrier 38A, the second output sample carrier 38D also comes from one of the sample storages 14a, 14b and is completely filled with sample containers 34. The second output sample carrier 38D is selected on the basis of which sample containers can still be received in the target sample carrier 38B after all sample containers necessary from the first output sample carrier 38A have been transported into the target sample carrier 38B.

In line e) it can be seen that the gripping device 32 now conveys a further sample container 34 from the first output sample carrier 38A into the target sample carrier 38B.

In line f) it can be seen that the gripping device 32 in turn fetches a new sample container 34 from the refilling sample carrier 38C and deposits the same in the output sample carrier 38A at the location of the sample container 34 previously removed.

In line g), all sample containers 34 required from the first output sample carrier 38A have now been transferred to the target sample carrier 38B. As can be seen, the gripping device 32 now removes another sample container 34 from the second output sample carrier 38D and deposits the same in the target sample carrier 38B. During this process, the now no longer necessary first output sample carrier 38A is removed from the sample carrier receptacle 36A by the main transport unit 16 and is returned to the sample storage. The first output sample carrier 38A is still completely filled with sample containers 34 so that there is no fragmentation of the sample storage occurring.

In line h) it can be seen that the gripping device 32 again fetches a new sample container 34 from the refilling sample carrier 38C and deposits the same in the second output sample carrier 38D at the location of the previously removed sample container 34. This process now continues, it being understood that the receptacle 36A for the first sample carrier 38A in step h) or in a subsequent step, may have a still further output sample carrier inserted therein, which was previously retrieved from the sample storage, so that further sample containers can be retrieved from the further sample carrier when all sample containers required from the second output sample carrier 38D are located in the target sample carrier 38B. As indicated by the dots, this game continues until finally all required sample containers 34 are received in the target sample carrier 38B. In this regard, it holds that, for each sample container 34 removed from one of the output sample carriers, a new sample container is immediately removed from the refilling sample carrier 38C and deposited at the location of the sample container which has just been removed from the output sample carrier.

One thus arrives at the state shown in line i) in which the target sample carrier 38B is completely filled with sample containers 34 and the refilling sample carrier 38C is now completely empty. The receptacles 36A, 36D for the output sample carriers are empty, because the output sample carriers, which are each completely filled with sample containers 34, have been transported back to the sample storage 14a, 14b.

The invention claimed is:

1. A method of loading a sample storage device for a plurality of sample carriers equipped with sample containers, comprising:
when removing sample containers from the sample storage device:
providing at least one output sample carrier having sample containers that can be taken up from the output sample carrier;
providing a target sample carrier in which sample containers taken up from the output sample carrier can be deposited;
providing a refilling sample carrier which is at least partially filled with sample containers;
removing at least one sample container from the output sample carrier and depositing the at least one sample container in the target sample carrier, and
for each sample container removed from the output sample carrier and deposited in the target sample carrier, removing another sample container from the refilling sample carrier and refilling the space of the removed sample container in the output sample carrier with said other sample container from the refilling sample carrier;
wherein said refilling of the space of the removed sample container in the output sample carrier with the other sample container from the refilling sample carrier overlaps in the time with the removal of the sample container from the output sample carrier and/or the deposition of the sample container in the target sample carrier.

2. The method of claim 1,
wherein said refilling of the space of the removed sample container in the output sample carrier with the other sample container from the refilling sample carrier takes place immediately following the removal of the sample container from the output sample carrier.

3. The method of claim 1,
further comprising replacing of the refilling sample carrier with another refilling sample carrier.

4. The method of claim 1,
wherein the refilling sample carrier is taken from a buffer storage.

5. The method of claim 4,
wherein said removal of refilling sample carriers from the buffer storage and/or receiving of refilling sample carriers the buffer storage takes place at least overlapping in time—with said receiving of sample containers from the output sample carrier and/or said deposition of sample containers in the target sample carrier.

6. The method of claim 1,
wherein a sample carrier is selected as a refilling sample carrier from sample carriers stored in a sample storage of the sample storage device.

7. The method of claim 6,
wherein from the sample carriers stored in the sample storage, there is selected, as the refilling sample carrier, at least one sample carrier having an as low as possible number of sample containers deposited therein.

8. The method of claim 1,
further comprising:
when storing sample containers in a sample storage of the sample storage device:
providing at least one sample container to be stored in an input sample carrier;
before depositing the input sample carrier in the sample storage, checking whether the input sample carrier can be utilized as the refilling sample carrier.

9. The method of claim 8,
comprising depositing of the input sample carrier as the refilling sample carrier in the buffer storage.

10. The method of claim 9,
wherein the buffer storage is refilled with refilling sample carriers from the sample storage when the number of refilling sample carriers the buffer storage falls below a predetermined number.

11. The method of claim 8,
wherein said depositing of sample containers from the sample storage and said storing of sample containers in the sample storage take place overlapping in time.

12. The method of claim 1,
wherein overlapping in time—with the filling of the target sample carrier with sample containers from a first output sample carrier, there is provided a further output sample carrier from which sample containers can be removed and deposited in the target sample carrier in a subsequent step.

13. The method of claim 1,
wherein overlapping in time—with said refilling of the output sample carrier with sample containers from a first refilling sample carrier, there is provided a further refilling sample carrier from which sample containers can be removed and deposited in the output sample carrier in a subsequent step.

14. The method of claim 1,
which is performed by a loading system cooperating with a sample storage of the sample storage device.

15. The method of claim 14,
wherein the loading system comprises a sample receiving/dispensing module for receiving sample containers from sample carriers and/or depositing sample containers in sample carriers, wherein at least three receptacles for the output sample carrier, the target sample carrier and the refilling sample carrier are provided in the sample receiving/dispensing module.

16. The method of claim 15,
wherein the sample receiving/dispensing module has a fourth receptacle provided therein for a further output sample carrier with sample containers to be received from the further output sample carrier, wherein the loading system is configured such that, overlapping in time—with the filling of the target sample carrier with sample containers from the first output sample carrier received in the first receptacle, there is provided a further output sample carrier in the fourth receptacle, from which sample containers can be removed and deposited in the target sample carrier in a subsequent step.

17. The method of claim 15,
wherein the sample receiving/dispensing module has a fifth receptacle provided therein for another refilling sample carrier, wherein the loading system is configured such that overlapping in time with the filling of the output sample carrier with sample containers from the first refilling sample carrier received in the third receptacle, there is provided a further refilling sample carrier in the fifth receptacle from which sample containers can be removed and deposited in the output sample carrier a subsequent step.

18. The method of claim 15,
wherein the position of the first, second, and third receptacle is fixed.

19. The method of claim 15,
wherein the loading system comprises at least one sample carrier transport unit for transporting sample carriers between the sample storage and the sample receiving/dispensing module.

20. The method of claim 14,
wherein the loading system comprises at least one input/output interface for inputting sample containers to be stored and/or for outputting sample containers to be dispensed.

21. The method of claim 1,
wherein the output sample carrier is a storage sample carrier that is configured for storage in the sample storage.

22. The method of claim 1,
wherein the target sample carrier is a transfer sample carrier that is configured for transporting sample containers between the sample storage the sample receiving/dispensing module and an input/output interface.

23. The method of claim 1,
wherein the refilling sample carrier is a transfer sample carrier configured for transporting sample containers between the sample storage or the sample receiving/dispensing module and an input/output Interface, or a storage sample carrier that is configured for storage in the sample storage.

24. The method of claim 1,
which is carried out by an electronic control unit.

25. A sample loading system for storing and/or removing sample containers from a sample storage device for a plurality of sample carriers equipped with sample containers, comprising:
a first receptacle for an output sample carrier having sample containers that can be taken up from the output sample carrier;
a second receptacle for a target sample carrier in which sample containers taken up from the output sample carrier can be deposited; and a third receptacle for a refilling sample carrier which is at least partially filled with sample containers, wherein the sample loading system is designed such that, for each sample container removed from the output sample carrier and deposited in the target sample carrier, there is removed another sample container from the refilling sample carrier and the space of the removed sample container in the output sample carrier is refilled with the other sample container from the refilling sample carrier;

wherein the sample loading system comprises an electronic control unit configured to carry out the method specified in claim 1.

* * * * *